(12) United States Patent
Wu et al.

(10) Patent No.: US 9,980,006 B2
(45) Date of Patent: May 22, 2018

(54) SYSTEMS AND METHODS OF RECALLING CHANNELS AND REVIEW BUFFER MANAGEMENT

(71) Applicant: OpenTV, Inc., San Francisco, CA (US)

(72) Inventors: Franklin Wu, San Francisco, CA (US); Gary Sano, Pleasanton, CA (US)

(73) Assignee: OPENTV, INC., San Francisco, CA (US)

( * ) Notice: Subject to any disclaimer, the term of this patent is extended or adjusted under 35 U.S.C. 154(b) by 0 days. days.

(21) Appl. No.: 14/669,385

(22) Filed: Mar. 26, 2015

(65) Prior Publication Data

US 2016/0286273 A1    Sep. 29, 2016

(51) Int. Cl.
| | |
|---|---|
| H04N 5/445 | (2011.01) |
| H04N 21/475 | (2011.01) |
| H04N 21/422 | (2011.01) |
| H04N 21/431 | (2011.01) |
| H04N 21/482 | (2011.01) |
| H04N 21/426 | (2011.01) |
| H04N 21/433 | (2011.01) |
| H04N 21/45 | (2011.01) |
| H04N 21/458 | (2011.01) |
| H04N 5/44 | (2011.01) |

(52) U.S. Cl.
CPC ..... *H04N 21/4755* (2013.01); *H04N 21/4221* (2013.01); *H04N 21/4263* (2013.01); *H04N 21/42203* (2013.01); *H04N 21/4312* (2013.01); *H04N 21/4333* (2013.01); *H04N 21/4532* (2013.01); *H04N 21/4583* (2013.01); *H04N 21/482* (2013.01); *H04N 21/4821* (2013.01); *H04N 2005/4412* (2013.01)

(58) Field of Classification Search
CPC ... H04N 21/40; H04N 21/231; H04N 21/4334
See application file for complete search history.

(56) References Cited

U.S. PATENT DOCUMENTS

| | | | |
|---|---|---|---|
| 7,818,766 B2 | 10/2010 | Ludvig et al. | |
| 8,427,356 B1 * | 4/2013 | Satish | H04N 21/44204 |
| | | | 341/176 |
| 8,595,772 B2 | 11/2013 | Jacobson et al. | |

(Continued)

FOREIGN PATENT DOCUMENTS

| | | |
|---|---|---|
| EP | 1575285 A2 | 9/2005 |
| WO | 97/32434 A1 | 9/1997 |
| WO | WO-2016154377 A1 | 9/2016 |

OTHER PUBLICATIONS

International Search Report and Written Opinion for PCT/US2016/023890 dated Jun. 6, 2016, 15 pp.

(Continued)

*Primary Examiner* — Junior Mendoza
(74) *Attorney, Agent, or Firm* — Schwegman Lundberg & Woessner, P.A.

(57) ABSTRACT

A device for enabling a user to cause programming associated with a channel to be presented is configured to enable a user to add channels to a subset of channels. Channels included in the subset of channel may be recalled upon activation of a dedicated button. Each of the subset of channels may be assigned a review buffer. The device may be configured to resolve review buffer conflicts.

24 Claims, 18 Drawing Sheets

(56) References Cited

U.S. PATENT DOCUMENTS

| | | | |
|---|---|---|---|
| 2002/0168178 A1* | 11/2002 | Rodriguez | H04N 5/76 386/293 |
| 2002/0174430 A1* | 11/2002 | Ellis | G11B 27/005 725/46 |
| 2002/0175953 A1* | 11/2002 | Lin | H04N 21/42204 715/811 |
| 2005/0044570 A1 | 2/2005 | Poslinski | |
| 2005/0198666 A1 | 9/2005 | Hsieh | |
| 2008/0002938 A1 | 1/2008 | Osborne | |
| 2008/0259220 A1 | 10/2008 | Stahulak et al. | |
| 2009/0244402 A1* | 10/2009 | Rye | G08C 17/00 348/734 |
| 2011/0184936 A1* | 7/2011 | Lymberopoulos | G06F 17/30902 707/721 |
| 2014/0282759 A1* | 9/2014 | Harvey | H04N 21/4333 725/89 |
| 2015/0026734 A1* | 1/2015 | Ellis | H04N 5/44543 725/56 |

OTHER PUBLICATIONS

"International Application Serial No. PCT/US2016/023890, International Preliminary Report on Patentability dated Oct. 5, 2017", 10 pgs.

* cited by examiner

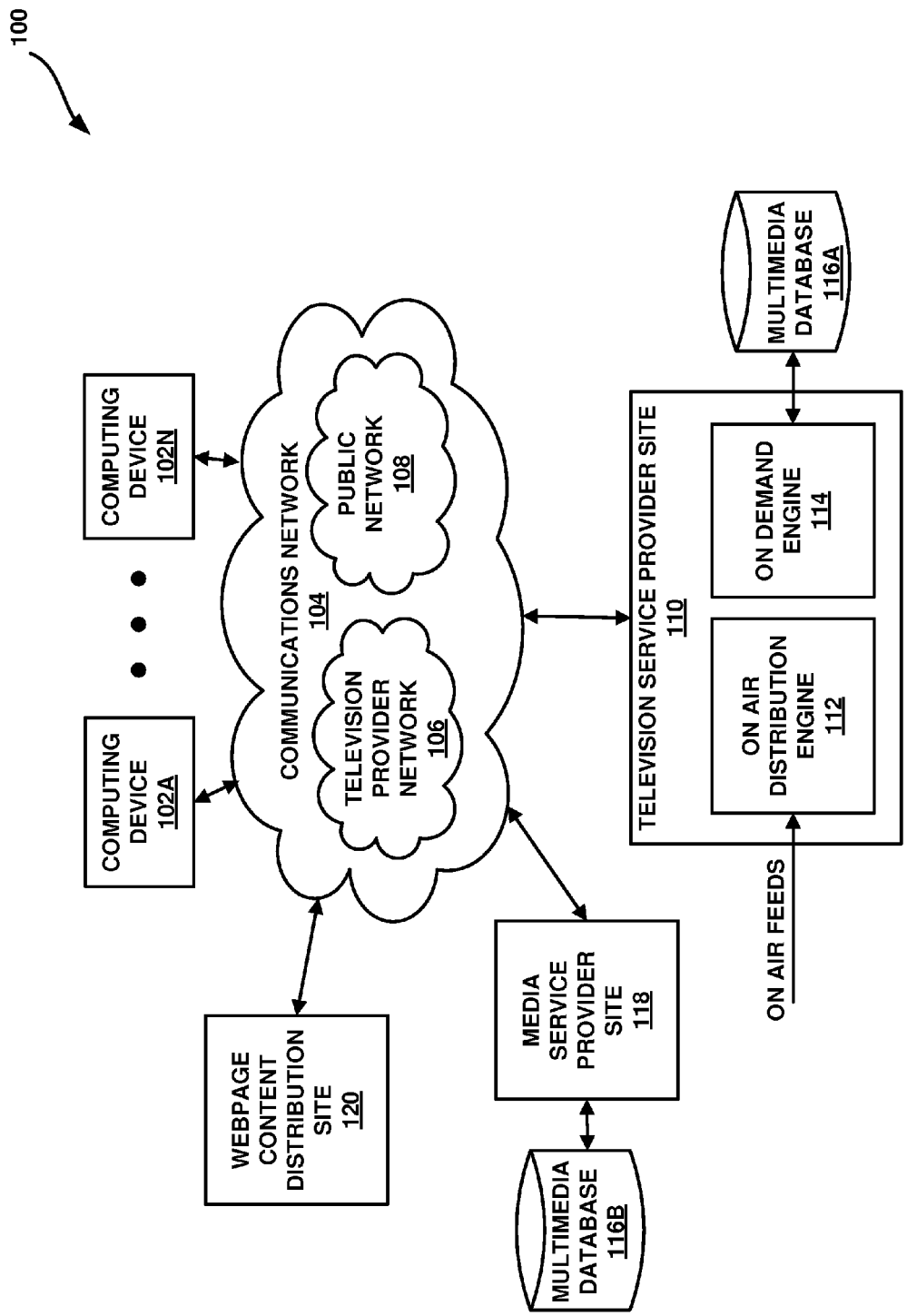

| | System On | Rote | Tune (107) | Rote | Tune (108) | Rote | Tune (185) | Rote | Tune (202) | Tune (203) | |
|---|---|---|---|---|---|---|---|---|---|---|---|
| Watching | CH 100 | | CH 107 | | CH 108 | | CH 185 | | CH 202 | CH 203 | |
| Rote1 | Avail-able | CH 100 | | | | | | | | CH 203 | |
| Rote2 | Available | | | CH 107 | | | | | | | |
| Rote3 | Available | | | | | CH 108 | | | | | |
| Rote4 | Available | | | | | | | CH 185 | | | |
| Buffer1 | CH 100 ($t_0$ to $t_8$) | | | | | | | | CH 202 ($t_8$ to $t_9$) | CH 203 ($t_9$ to $t_x$) | |
| Buffer2 | Available | | | CH 107 ($t_2$ to $t_x$) | | | | | | | |
| Buffer3 | Available | | | | | CH 108 ($t_4$ to $t_x$) | | | | | |
| Buffer4 | Available | | | | | | | CH 185 ($t_6$ to $t_x$) | | | |
| Buffer5 | Unavailable (Scheduled Recording) | | | | | | | | | | |
| | $t_0$ | $t_1$ | $t_2$ | $t_3$ | $t_4$ | $t_5$ Time | $t_6$ | $t_7$ | $t_8$ | $t_9$ $t_{10}$ | $t_x$ |

SYSTEMS AND METHODS OF RECALLING CHANNELS AND REVIEW BUFFER MANAGEMENT

TECHNICAL FIELD

The present disclosure relates to the field of interactive television and user interfaces.

BACKGROUND

Digital media playback capabilities may be incorporated into a wide range of devices, including digital televisions, so-called "smart" televisions, laptop or desktop computers, tablet computers, digital recording devices, digital media players, video gaming devices, cellular telephones, including so-called "smart" phones, dedicated video streaming devices, and the like. Digital media content may originate from multiple sources including, for example, over-the-air television providers, satellite television providers, and cable television providers. In order to access digital media content from one of these sources, a device may include a tuner to physically tune to a frequency band and a de-multiplexor to extract digital content from within the frequency band. For example, a set-top box may include an ASTC or a DVB tuner.

A conventional set-up box or television may include a previous channel recall function. A typical previous channel recall function may be implemented using a button on a remote control (e.g., a "Last" button, a "Recall" button, a "Pre-CH" button, a "Prev" button, a "Jump" button, etc.). Conventional previous channel recall functions are typically limited to a set of two channels, i.e., the currently tuned channel, and the most recent previously tuned channel, and simply enable a user to toggle between these two channels. Conventional previous channel recall functions may be less than ideal.

SUMMARY

The following brief summary is not intended to include all features and aspects of the present invention, nor does it imply that the invention must include all features and aspects discussed in this summary. The present disclosure relates to the field of interactive television and more specifically describes techniques and user interfaces, including user input devices for enhancing the user experience of navigating and displaying programming content. The techniques described herein may be particularly useful for video distribution systems having a large number of channels, e.g., dozens to hundreds. In one example, the techniques described herein may enhance a user's experience of navigating and displaying programming content by providing a channel cycling function. In some examples, the techniques may be implemented in a device with digital media playback capabilities, including for example, laptop or desktop computers, tablet computers, smart phones, set top boxes, and televisions.

According to one example of the disclosure, a method for enabling content selection comprises determining whether a currently presented channel is included in a subset of channels, and based on whether the currently presented channel is included in the subset of channels, performing one of adding the currently presented channel to the subset of the channels, or causing a channel included in the subset of channels to be presented.

According to another example of the disclosure, a device for enabling content selection comprises one or more processors configured to determine whether a currently presented channel is included in a subset of channels, and based on whether the currently presented channel is included in the subset of channels, perform one of adding the currently presented channel to the subset of channels or causing a channel included in the subset of channels to be presented.

According to another example of the disclosure, an apparatus for enabling content selection comprises means for determining whether a currently presented channel is included in a subset of channels, and means for performing one of adding the currently presented channel to the subset of channels or causing a channel included in the subset of channels to be presented based on whether the currently presented channel is included in the subset of channels.

According to another example of the disclosure, a non-transitory computer-readable storage medium has instructions stored thereon that upon execution cause one or more processors of a device to determine whether a currently presented channel is included in a subset of channels, and based on whether the currently presented channel is included in the subset of channels, perform one of adding the currently presented channel to the subset of channels or causing a channel included in the subset of channels to be presented.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is block diagram illustrating an example of a system that may implement one or more techniques of this disclosure.

FIGS. 10A-10B are conceptual diagrams illustrating an example of a channel recall function according to one or more techniques of this disclosure.

FIGS. 11A-11B are conceptual diagrams illustrating an example of a channel recall function according to one or more techniques of this disclosure.

DETAILED DESCRIPTION

Described herein are systems and methods for enabling the selection of content. Some embodiments extend to non-transitory machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or may be combined or subdivided. In the following description, for purposes of explanation, numerous specific details are set forth to provide a thorough understanding of example embodiments. It will be evident to one skilled in the art, however, that the present subject matter may be practiced without these specific details.

Devices with digital media playback capabilities, including, for example, televisions and set top boxes, may be configured to provide users thereof with an interface that enables a user to tune to a particular television channel (e.g., ABC or NBC). For example, a television or set-top box may include a push button remote control that enables a user to navigate to a particular channel by entering a number corresponding to a particular channel (e.g., 100). As users may find it desirable to be able to more quickly tune to or recall a particular channel, an interface may include functionality that enables a user to tune to a channel without having to enter the number corresponding to the particular television channel or navigate to the channel using an electronic programming guide (EPG). As described above, an example of such a function includes a so-called previous channel recall function enabling a user to toggle between two channels.

Figure 3:
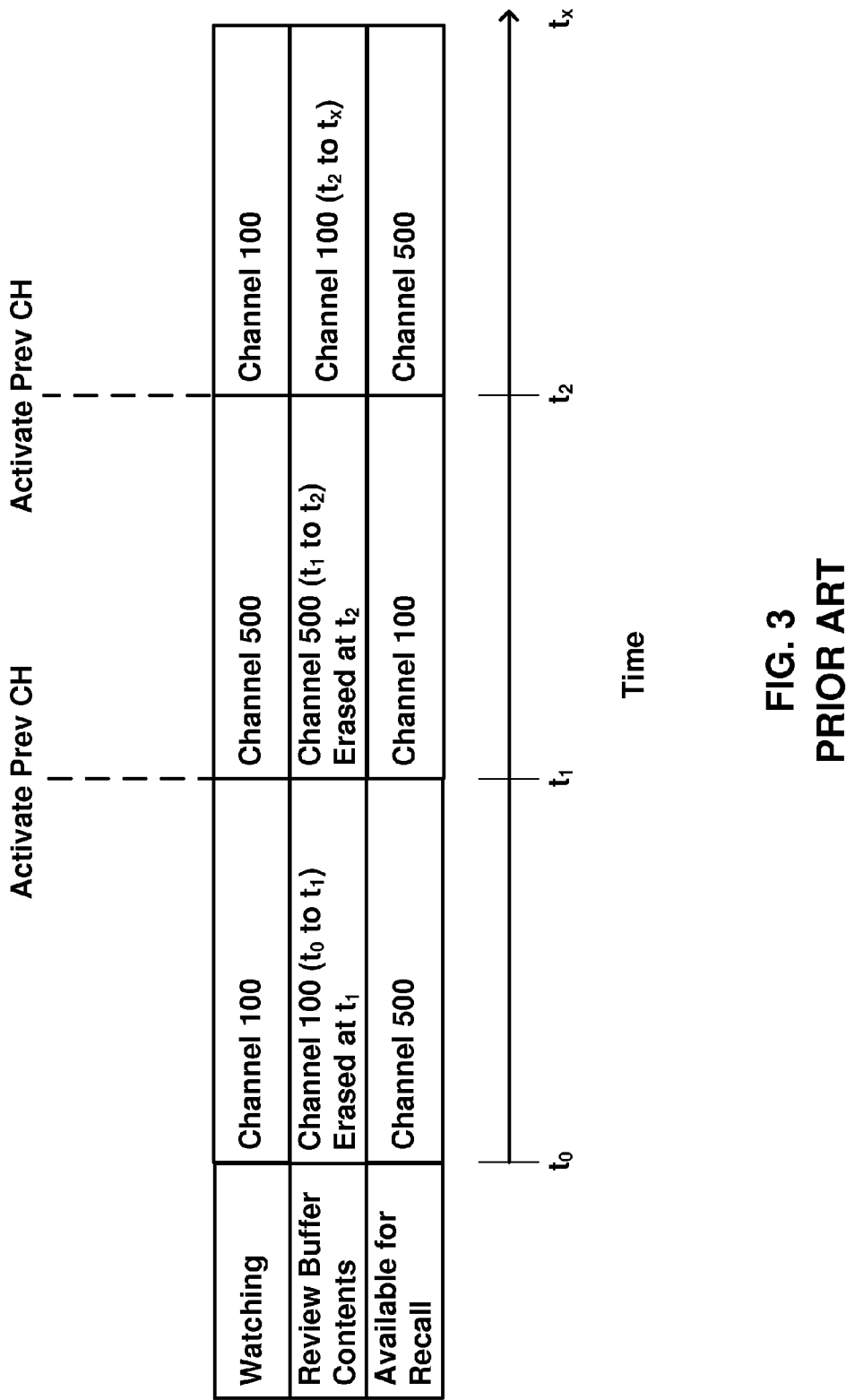
FIG. 3 is a conceptual diagram illustrating an example of a conventional previous channel recall function.

Further, devices with digital media playback capabilities may include recording functionality. Such recording functionality may be included in a personal video recorder (PVR) or a digital video recorder (DVR) that may be operably coupled to or integrated into a device including tuners. The recording functionality may be configured to store media content accessed through a tuner. This may enable a user to watch television programming at a later point in time (e.g., "time-shift" a television show). Further, the recording functionality may be configured to provide a review buffer, where a review buffer stores previously viewed portions (e.g., five minutes) of a currently tuned channel. A review buffer may enable a user to pause, rewind, and/or replay portions of a currently tuned television program. In a conventional set-top box having recording capabilities, typically only a single review buffer for the currently tuned channel is implemented. Thus, in this case when a user tunes to another channel (e.g., activates the previous channel button), the review buffer becomes associated with the new currently tuned channel and the contents of the review buffer stored for the now previously tuned channel are erased. FIG. 3 is a conceptual diagram illustrating an example of a conventional previous channel recall function. As illustrated in FIG. 3, as a user activates a previous channel recall function, the contents of the review buffer associated with the previously tuned channel are erased (e.g., Channel 100 ($t_0$ to $t_1$) erased at $t_1$ upon recall of channel 500) and as such when a user returns to channel 100 at $t_2$, the user is unable to access portions of the program presented on channel 100 prior to $t_2$.

Thus, when using a television or set-top box having a conventional previous channel function and conventional review buffer functionality, a user does not have the ability to rewind the now previously tuned channel, upon returning to the previously tuned channeled (e.g., subsequently activating a previous channel recall function). As such, a user will not be able to replay the content that was playing on the previous tuned channel upon recall of the previously viewed channel. Further, a user may find it desirable to be able to recall more than a single previously tuned channel. The techniques described herein may enable a user to more efficiently tune to a channel and/or access a previously presented portion of content associated with the channel.

FIG. 1 is block diagram illustrating an example of a system that may implement one or more techniques described in this disclosure. System 100 may be configured to enable content selection in accordance with the techniques described herein. In the example illustrated in FIG. 1, system 100 includes one or more computing devices 102A-102N, communications network 104, television service provider site 110, media service provider site 118, and webpage content distribution site 120. System 100 may include software modules operating on one or more servers. Software modules may be stored in a memory and executed a processor. Servers may include one or more processors and a plurality of internal and/or external memory devices. Examples of memory devices include file servers, FTP servers, network attached storage (NAS) devices, local disk drives, or any other type of device or storage medium capable of storing data. Storage media may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, images, webpages, messages, voice communications, and applications, to be distributed to and accessed by a plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of standards included in the IEEE 802 family of standards.

As illustrated in FIG. 1, networks of different types may be defined within communications network 104. Networks may be defined according to physical and/or logical aspects. For example, networks that share the same physical infrastructure (e.g., coaxial cables) may be distinguished based on a primary service type (e.g., webpage access or television service). Physical and logical aspects of networks may be described according to a layered model. For example, layers of a model may respectively define physical signaling, addressing, channel access control, packet properties, and data processing in a communications system. One example of a layered model is the Open Systems Interconnection (OSI) model. In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription-based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider 110 represents an example of a television service provider site. Television service provider 110 may be configured to provide computing devices 102A-102N with television service. For example, television service provider 110 may be a public broadcast station, a cable television provider, or a satellite television provider and may be configured to provide television services to analog and/or digital televisions and set top boxes. In the example illustrated in FIG. 1, television service provider 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television transmissions via a satellite uplink/downlink and distribute the over-the-air television transmissions to one or more users of a subscription-based cable television service.

On demand engine 114 may be configured to access a multimedia library and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a Pay Per View (PPV) basis. Multimedia database 116A may be a storage device configured to store multimedia content. It should be noted that multimedia content accessed through on demand engine 114 may also be located at various sites within system 100 (e.g., peer-to-peer distribution).

Media service provider site 118 represents an example of a multimedia service provider. Media service provider site 118 may be configured to access a multimedia library and distribute multimedia content to one or more of computing devices 102A-102N through public network 108. For example, media service provider site 118 may access multimedia (e.g., music, movies, and TV shows) stored in multimedia database 116B and provide a user of a media service with multimedia. Multimedia database 116B may be a storage device configured to store multimedia content. In one example, media service provider site 118 may be configured to provide content to one or more of computing devices 102A-102N using the Internet protocol suite. In some examples, a media service may be referred to as a streaming service. Commercial examples of media services may include Hulu, YouTube, Netflix, Amazon Prime, and television network based streaming services (e.g. WatchESPN). As described above, television provider network 106 and public network 108 may share physical and logical aspects. Thus, content accessed by one or more of computing devices 102A-102N through media service provider site 118 may be transmitted through physical components of television provider network 106. For example, a user of a computing device may access the internet and multimedia content provided by a media service through a cable modem connected to a coaxial network maintained by a cable television provider.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example, Hypertext Markup Language (HTML), Dynamic HTML, and Extensible Markup Language (XML). Examples of webpage content distribution sites include the United States Patent and Trademark Office website.

Figure 2A:
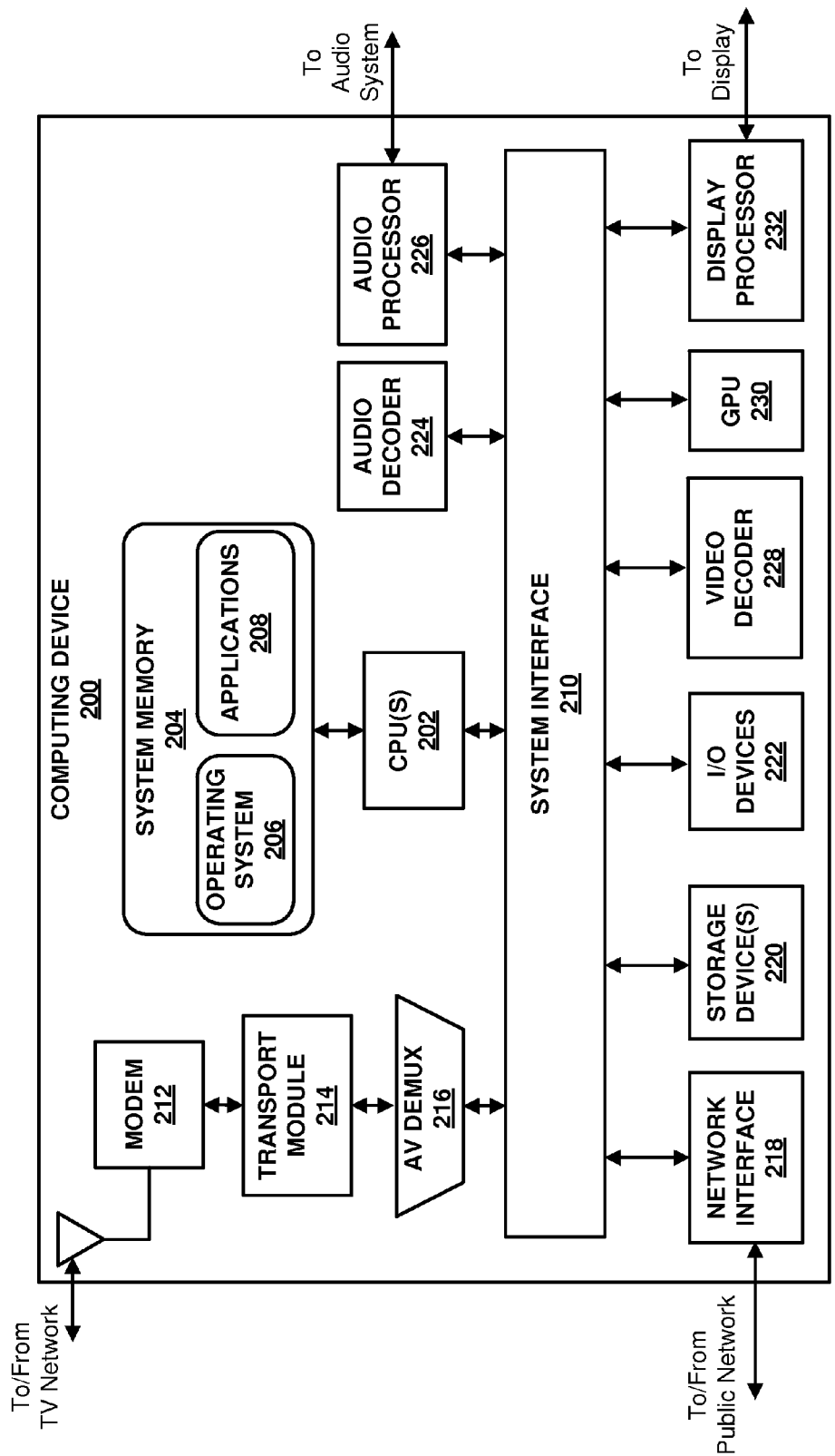
FIG. 2A is a block diagram illustrating an example of a computing device that may implement one or more techniques of this disclosure.

FIG. 2A is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, or a digital video recorder), a portable computing device (e.g., a mobile phone, a laptop, a personal data assistant (PDA), or a tablet device) or another type of computing device. In the example illustrated in FIG. 2A, computing device 200 is configured to send and receive data via a television network, such as, for example, television network 106 described above and send and receive data via a public network, such as, for example, public network 108. It should be noted that in other examples, computing device 200 may be configured to send and receive data through one of a television network 106 or a public network 108. The techniques described herein may be utilized by devices configured to communicate using any and all combinations of communications networks.

As illustrated in FIG. 2A, computing device 200 includes central processing unit(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232. As illustrated in FIG. 2A, system memory 204 includes operating system 206 and applications 208. Each of processor(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

CPU(s) 202 may be configured to implement functionality and/or process instructions for execution in computing device 200. CPU(s) 202 may be capable of retrieving and processing instructions, code, and/or data structures for implementing one or more of the techniques described herein. Instructions may be stored on a computer readable medium, such as system memory 204 or storage devices 220. CPU(s) 202 may include multi-core central processing units.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204, may be configured to store information that may be used by computing device 200 during operation. System memory 204 may be used to store program instructions for execution by CPU(s) 202 and may be used by software or applications running on computing device 200 to temporarily store information during program execution. For example, system memory 204 may store instructions associated with operating system 206 and applications 208. Applications 208 may include applications implemented within or executed by computing device 200 and may be implemented or contained within, operable by, executed by, and/or be operatively/communicatively coupled to components of computing device 200. Applications 208 may include instructions that may cause CPU(s) 202 of computing device 200 to perform particular functions. In one example, applications 208 may cause computing device 200 to perform functions associated with the example channel cycling techniques described herein. Applications 208 may include algorithms which are expressed in computer programming statements, such as, for-loops, while-loops, if-statements, do-loops, etc. Applications 208 may be distributed to computing device 200 through an application distribution site.

As further illustrated in FIG. 2A, applications 208 may execute in conjunction with operating system 206. That is, operating system 206 may be configured to facilitate the interaction of applications 208 with CPUs(s) 202, and other hardware components of computing device 200. It should be noted that in some examples, components of operating system 206 and components acting in conjunction with operating system 206 may be referred to as middleware. The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV, Windows operating systems, Linux operation systems, Mac operating systems, Android operating systems, and any and all combinations thereof.

System interface 210 may be configured to enable communications between components of computing device 200. In one example, system interface 210 comprises structures that enable data to be transferred from one peer device to another peer device or to a storage medium. For example, system interface 210 may include a chipset supporting Accelerated Graphics Port ("AGP") based protocols, Peripheral Component Interconnect (PCI) bus based protocols, such as, for example, the PCI Express ("PCIe") bus specification, which is maintained by the Peripheral Component Interconnect Special Interest Group, or any other form of structure that may be used to interconnect peer devices.

Storage devices 220 represent memory of computing device 200 that may be configured to store relatively larger amounts of information for relatively longer periods of time than system memory 204. For example, in the example where computing device 200 is included as part of a digital video recorder, storage devices 220 may be configured to store numerous video files. In one example, storage device(s) 220 may include one or more review buffers. Similar to system memory 204, storage device(s) 220 may also include one or more non-transitory or tangible computer-readable storage media. Storage device(s) 220 may include internal and/or external memory devices and in some examples may include volatile and non-volatile storage elements.

I/O devices 222 may be configured to receive input and provide output during operation of computing device 200. Input may be generated from an input device, such as, for example, a push-button remote control, a motion based remote control, a device including a touch-sensitive screen, a device including a track pad, a mouse, a keyboard, a microphone, a video camera, a motion sensor, or any other type of device configured to receive user input. In one example, an input device may include an advanced user input device, such as a smart phone or a tablet computing device. For example, an input device may be a secondary computing device and may be configured to receive user input via touch gestures, buttons on the secondary computing device, and/or voice control. Further, in some examples, an input device may include a display that is configured to display the graphical users interfaces described herein. For example, in the case where computing device 200 includes a television, an input device may include a smart phone in communication with the television. In this example, a user may provide commands to a television by activating portions of a graphical user interface displayed on a smart phone. The graphical user interface displayed on the smart phone may be a replica or an extension of a graphical user interface displayed on the television. Output may be provided to output devices, such as, for example internal speakers, an integrated display device, and/or external components, such as, a secondary computing device. In some examples, I/O device(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol.

Figure 2B:
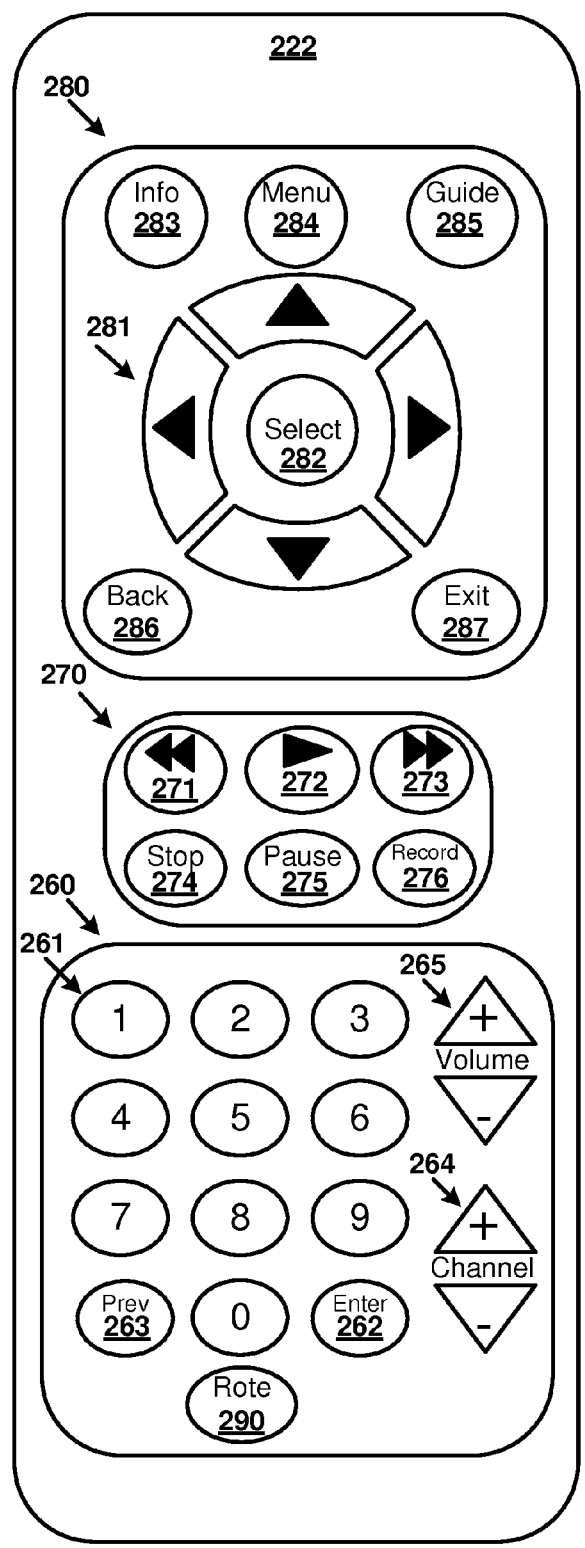
FIG. 2B is a conceptual diagram illustrating an example of an input/output device that may implement one or more techniques of this disclosure.

FIG. 2B is a conceptual diagram illustrating an example of an input/output device that may implement one or more techniques of this disclosure. In the example illustrated in FIG. 2B, I/O device 222 is illustrated as a push-button remote control. It should be noted that while I/O device 222 is illustrated as a push-button remote control in the example illustrated in FIG. 2B, in other examples, the functionality of I/O device 222 may be implemented using other types of I/O devices, such as, for example, a secondary computing device in communication with a primary computing device. Further, in other examples, functions achieved by activation of buttons of I/O device 222 may be achieved through other types of user inputs. For example, in the case where an I/O device includes a touchscreen, gesture recognition, and/or voice recognition, virtual buttons may be presented on the touchscreen and functions achieved by activation of buttons on I/O device 222 may be achieved through any and all combinations of virtual button activation, motion gestures, and/or voice commands. In one example, an I/O device may have voice recognition capabilities and a function achieved by activation of rote button 290 may be achieved by a user saying "Rote," "Cycle," or a similar phrase.

In the example illustrated in FIG. 2B, I/O device 222 includes basic television controls 260, playback controls 270, and navigational controls 280. Basic television controls 260 may be configured to enable a user to perform basic tuning and volume control functions associated with viewing television programming. Further, in one example, basic television controls may enable a user to perform one or more of the channel cycling functions described herein. As illustrated in FIG. 2B, basic television controls 260 include numeric keypad 261, enter button 262, previous channel button 263, channel change buttons 264, volume control buttons 265, and rote button 290. Numeric keypad 261, enter button 262, previous channel button 263, channel change buttons 264, and rote button 290 may be configured to enable a user to tune to a particular analog and/or digital channel. Upon a user entering a sequence of numbers using numeric keypad 261 and, optionally, additionally activating enter key 262, a tuner may tune to a specified channel. Upon activation of previous channel button 263, a tuner may tune to a previously tuned channel. Activation of "+" and "−" channel buttons 264 may respectively cause a tuner to tune to the respective next channel in a sequence of channels. Activation of "+" and "−" volume control buttons 265 may respectively cause the output of an audio system to be increased or decreased. Activation of rote button 290 may cause computing device to perform one or more of the channel cycling functions described herein. In one example, rote button 290 may be configured to only perform channel cycling functions described herein and in this manner may be a dedicated channel cycling button. It should be noted that although the basic television controls 260 may be configured to enable a user to perform basic tuning and volume control functions associated with a television, in some examples, basic television controls 260 may be used to perform other functions associated with a computing device.

Playback controls 270 may be configured to enable a user to control the playback of and/or record multimedia content. For example, playback controls 270 may enable a user to control the playback of a video originating from a media service provider site, an on demand engine, and/or a personal video recorder (PVR). As illustrated in FIG. 2B, playback controls 270 include reverse playback button 271, normal playback button 272, forward playback button 273, stop playback button 274, pause playback button 275, and record button 276. Reverse playback button 271 may enable to a user to navigate to a previous point in a multimedia sequence. In one example, activation of reverse playback button 270 may cause a previously presented portion of content to be accessed from a review buffer. Upon activation, normal playback button 272 may cause normal playback of an item of multimedia content to begin or resume. Forward playback button 273 may enable a user to navigate to a future point in a multimedia sequence. Upon activation, stop playback button 274 may cause the playback of an item of multimedia content to cease. Upon activation, pause playback button 275 may cause the playback of an item of multimedia content to be paused. Record button 276 may enable a user to cause an item of multimedia content to be stored to a storage device. In one example, record button 276 may enable a user to record content to a storage device. It should be noted that although playback controls 270 may be configured to enable a user to control the playback of and/or record multimedia content, in some examples playback controls 270 may be used to perform other functions associated with a computing device.

As described above, devices with digital media playback capabilities, including, for example, televisions, set top boxes, and mobile devices, may be configured to provide users thereof with graphical user interfaces that enable the selection of content. Navigational controls 280 may be configured to enable a user to navigate graphical user interfaces and select content using a graphical user interface. In one example, navigational controls 280 may be configured to enable a user to navigate graphical user interfaces and select channels associated with a channel cycling function described herein. For example, navigational controls 208 may enable a user to select one or more channels to be deleted from a cycle as described below with respect to FIG. 7.

In the example illustrated in FIG. 2B, navigational controls 280 include navigational arrow buttons 281, select button 282, information button 283, menu button 284, guide button 285, back button 286, and exit button 287. Navigational arrow buttons 281 may be configured to move the position of a cursor associated with a graphical user interface and/or change the selection of an item included in a graphical user interface. For example, navigational arrow buttons 281 may enable the user to change the selection of an icon included in the graphical user interface illustrated in FIG. 7.

Select button 282 may enable a user to further select an icon. As described in detail below, an icon representing a channel may be selected by a user. In one example, consecutive activations of select button 282 may cause respective levels of selection to occur. Information button 283 may be configured to cause additional information associated with an item of content of to be displayed. For example, when an icon representing an item of content is initially selected, activation of information button 283 may cause information associated with the content (e.g., cast and crew information) to be displayed.

Menu button 284, guide button 285, back button 286, and exit button 287 may be configured to enable a user to cause different graphical user interfaces to be presented. Upon activation, menu button 284 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 285 may be configured to provide a graphical user interface that enables a user to select content. In one example, upon activation of guide button 285, a graphical user interface including a grid guide may be presented to a user.

Back button 286 may be configured to enable a user to return to a previous graphical user interface. Exit button 287 may be configured to enable a user to return to a full screen viewing mode. For example, when a graphical user interface is displayed, upon activation of exit button 287, the graphical user interface may "disappear" and full screen content viewing mode may be presented to a user.

Referring again to FIG. 2A, computing device 200 is configured to send and receive data via a television network, such as, for example, television network 106 described above and send and receive data via a public network, such as, for example, public network 108. As described above, a communications network may be described based on a model including layers that define communication properties, such as, for example, physical signaling, addressing, channel access control, packet properties, and data processing in a communications system. In the example illustrated in FIG. 2A, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as, for example, television provider network 106. In one example, modem 212 may configured to receive signals from a coaxial cable and/or an over-the-air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport model 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to separate video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as distinct functional blocks, the functions performed by modem 212, transport module 214, and AV demux 216 may be highly integrated and realized using any combination of hardware, firmware and/or software implementations.

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as, for example, public network 108. Further, in a manner similar to that described above with respect to transport module 214 and A/V demux 216, network interface 218 may be configured to extract audio packets, video packets, and data packets from a data stream. For example, network interface 218 may be configured to extract video packets, audio packets, and data packets according to one or more of internet protocol (IP), transport control protocol (TCP), real time streaming protocol (RTSP), user datagram protocol (UDP), real time protocol (RTP), MPEG transport stream protocols, and IPTV protocols. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over-the-top content source, a personal video recorder (PVR), and a peer-to-peer content source.

Referring again to FIG. 2A, data associated with digital content, such as, for example, music, videos, images, webpages, messages, voice communications, and applications may be stored in a computer readable medium, such as, for example, system memory 204 and storage devices 220. Data stored in a memory device may be retrieved and processed by CPU(s) 202, audio decoder 224, audio processor 226, video decoder 228, graphics processing unit 230, and display processor 232. As described above, CPU(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulse-code modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system.

Video decoder 228 may be configured to retrieve and process coded video data. For example, video decoder 228 may be a combination of hardware and software used to implement aspects of video codec. In one example, video decoder 228 may be configured to decode video data encoded according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8, and High-Efficiency Video Coding (HEVC).

As described above, a device with media playback capabilities may provide a graphical user interface (e.g., an EPG) that enables a user to select content. A graphical user interface may include images and graphics displayed in conjunction with video content (e.g., playback icons overlaid on a video). Graphics processing unit 230 is an example of a dedicated processing unit that may be configured to generate graphical user interfaces, including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 230 may include multiple processing cores and may be configured to operate according to OpenGL (Open Graphic Library, managed by the Khronos Group) and/or Direct3D (managed by Microsoft, Inc.).

Display processor 232 may be configured to retrieve and process pixel data for display. For example, display processor 232 may receive pixel data from video decoder 228 and/or graphics processing unit 230 and output data for display. Display processor 232 may be coupled to a display, such as display 250 (not shown in FIG. 1) using a standardized communication protocol (e.g., HDMI, DVI, DisplayPort, component video, composite video, and/or VGA). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television, or an ultra-resolution display as described above. Further, display 250 may include an integrated display of a portable computing device (e.g., a mobile phone, a laptop, a personal data assistant (PDA), or a tablet device). As described above, in some examples a portable computing device may operate as an I/O device for a stationary computing device.

Figure 4:
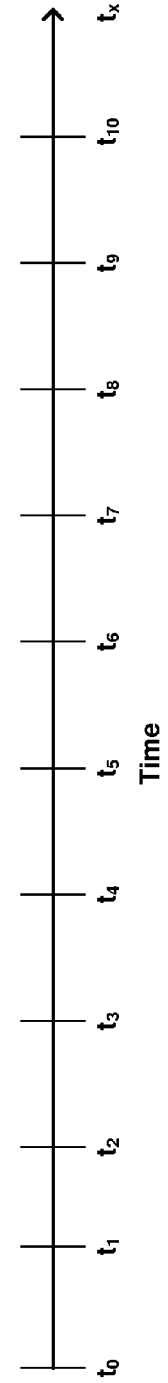
FIG. 4 is a conceptual diagram illustrating an example of a channel recall function according to one or more techniques of this disclosure.
Figure 5:
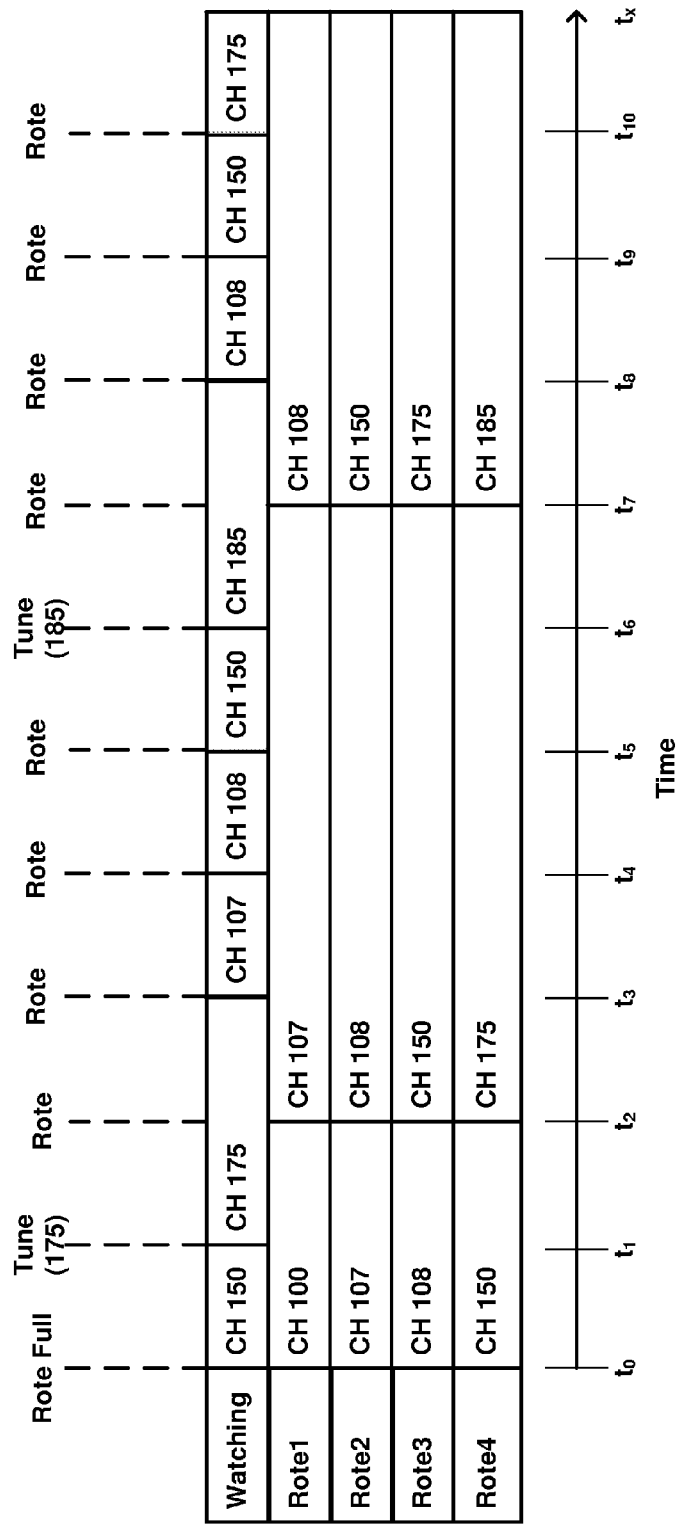
FIG. 5 is a conceptual diagram illustrating an example of a channel recall function according to one or more techniques of this disclosure.

As described above, for example, with respect to FIG. 3, conventional previous channel recall functions may be less than ideal. FIGS. 4-5 are conceptual diagrams illustrating an example channel recall function that may be implemented according to one or more of the techniques described herein. In the examples illustrated in FIGS. 4-5, a computing device (e.g., a digital television or a set-top box) may respectively classify channels as a channel that a user is currently watching (e.g., currently being presented on a display) and one or more rote channels (e.g., Rote1-RoteN). As described in detail below, a rote channel may refer to a channel that a user may be able to recall (e.g., cause to be presented on a display) using a rote function. It should be noted that the term "rote" may be short for rotation and may generally refer to a function that enables a user to rotate/cycle through a subset of available channels. In one example, the subset of channels may be referred to as rote channels or a rote stack and each channel within the subset may be referred to as a rote channel. The techniques described herein may be used to add/remove/replace channels in a subset, cycle through channels in a subset and/or manage review buffers associated with such channels.

In the example illustrated in FIG. 4, a computing device may be configured to include any number of rote channels. In the example illustrated in FIG. 5, an example computing device is configured to implement a maximum of four rote channels. It should be noted that the techniques described herein are not limited to a maximum of four rote channels. In one example, a computing device may be configured to enable a user to explicitly set a maximum number of rote channels (e.g., through a settings menu). For example, a user may wish to cycle through a number of sporting events that are being aired simultaneously (e.g., eight live sporting events). In another example, a user may wish to cycle through a number of reality television shows that are being aired simultaneously (e.g., three reality television shows). Thus, in one example, a user may be able to dynamically set the maximum number of rote channels based on the user's preferences.

FIG. 4 illustrates an example of a user setting channels as rote channels (i.e., populating a rote stack) and cycling through rote channels. As illustrated in FIG. 4, at an initial time (t0), a computing device is powered on. In the example illustrated in FIG. 4, at t0, a computing device is initialized with a channel a user is watching (e.g., a currently tuned channel that is being displayed) and a plurality of rote channels are available (i.e., no channel is currently associated them). It should be noted that although in the example illustrated in FIG. 4 each of the rote channels are initialized as available, in other examples, each of Rote1-RoteN may be associated with default channels. For example, Rote1-RoteN may be initialized with a user's favorite channels (e.g., most frequently viewed channels, channels explicitly set by a user, and/or channels determined by a predictive algorithm). Further, it should be noted that in some examples, a computing device may be configured to present multiple channels simultaneously (e.g., a so-called Picture-in-Picture presentation). In one example, the Watching channel in FIG. 4 may be associated with a channel that is displayed in a main presentation window and each of Rote1-RoteN may be associated with ancillary presentation windows.

In the example illustrated in FIG. 4, a user executing a rote operation may correspond to a user activating rote button 290, which causes operations associated with a rote function to be executed. In this manner, as described in further detail below with respect to FIG. 6, a rote stack may be populated (e.g., channels added and replaced) and a user may cycle through a rote stack using a single dedicated button. In other examples, rote operations may be associated with multiple buttons, buttons which may or may not be dedicated to rote operations. For example, in one example, an I/O device may include dedicated "Add to Rote" and "Cycle" buttons and as such, rote stack populating and rote stack cycling operations may be associated with distinct inputs. Further, in other examples, rote operations may correspond to buttons having other functions. For example, navigational arrows 281 and/or associated graphical user interfaces may be used to execute rote operations. For example, in some instances execution of "up" navigation arrow may be equivalent to activation of rote button 290. Thus, the techniques described herein are not limited to a specific I/O device.

Referring again to FIG. 4, at $t_1$, a user executes a rote operation (e.g., activates rote button 290) which causes the channel the user is currently watching (i.e., channel 100) to become associated with Rote1. At $t_2$, a user tunes to channel 107 (e.g., using numeric keypad 261 or channel up/down 264), which causes channel 107 to become the channel that is currently being presented. At $t_3$, a user executes a rote operation which causes the channel the user is currently watching (i.e., channel 107) to become associated with Rote2. In this manner, at $t_1$ and $t_3$ execution of a rote operation causes channels to be added to a rote stack. At $t_4$, a user executes a consecutive rote operation which causes channel 100 to be recalled (e.g., become the channel that is displayed in a main presentation). At $t_5$, a user executes another consecutive rote operation which causes channel 107 to be recalled. In this manner, at $t_4$ and $t_5$ execution of a rote operation causes a rote channel to be recalled. That is, in one example, as described with respect to FIG. 6, if the channel a user is currently watching is already in the rote stack, activation of rote button 290 causes cycling to occur and if the channel the user is currently watching is not in the rote stack, activation of rote button 290 may cause the channel to become associated with an available rote channel. At $t_6$-$t_x$, a user continues to populate a rote stack (i.e., add channel 108 at $t_7$) and recall channels in a rote stack (i.e., cycle through channels 100, 107, and 108 at $t_8$-$t_{10}$) by executing rote operations. In this manner a computing device may be configured to determine whether a currently presented channel is included in a subset of channels, and based on whether the currently presented channel is included in the subset of channels, perform one of adding the currently presented channel to the subset of the channels or causing a channel included in the subset of channels to be presented.

As described above, a rote stack may include a maximum number of rote channels. That is, a scenario may exist where no rote channels are available (i.e., each rote channel is associated with a channel), a channel that is not in the rote stack is currently being presented, and a user executes a rote operation. FIG. 5 illustrates an example where a user executes a rote operation when a channel not currently in a rote stack is being presented and there are no available rote channels. As illustrated in FIG. 5, at $t_2$, a user is watching channel 175 and each of Rote1-Rote4 are associated with channels other than channel 175. Thus, in the example illustrated in FIG. 5, in order for channel 175 to be associated with one of Rote1-Rote4, a channel associated with one of Rote1-Rote4, must be replaced. It should be noted that in the example illustrated in FIG. 5, a number associated with a rote channel may indicate the order in which a particular channel became associated with a rote channel. That is, in FIG. 5, at to, channel 100 may be the channel that was first added to the rote stack (i.e., oldest rote channel) and channel 150 may be the channel that was most recently added to the rote stack (i.e., newest rote channel).

In the example illustrated in FIG. 5, as illustrated at $t_2$ and $t_7$, upon a user executing a rote operation, the oldest rote channel is removed from the rote stack (i.e., channel 100 at $t_2$ and channel 107 at $t_7$) and the channel that is currently being presented (i.e., channel 175 at $t_2$ and channel 185 at $t_7$) is associated with Rote4. Thus, the order in which channels were added to the rote stack is maintained. That is, the channel associated with Rote1 is removed, the channel associated with Rote2 becomes associated with Rote1, the channel associated with Rote3 becomes associated with Rote2, the channel associated with Rote4 becomes associated with Rote3, and the new channel becomes associated with Rote4. In this manner, activation of a rote operation will cause the oldest rote channel to be replaced with the currently presented channel. It should be noted that the example illustrated in FIG. 5 provides one example technique of how a channel may be replaced in a rote stack accordingly to a priority rule. In other examples other techniques may be used when no rote channels are available. In one example, one or more exceptions to replacing the oldest rote channel may be occur. For example, in one case, an exception may occur such that the most recently watched channel may not be replaced in the rote stack, regardless of if the most recently watched channel is also the oldest rote channel. Upon the exception, the second oldest channel may be replaced from the rote stack. For example, referring to FIG. 5, if a user had been watching CH 100 from $t_0$-$t_1$, channel 107 may be replaced in the rote stack at $t_2$. In one example, a computing device may be configured to enable a user to explicitly set (e.g., through a settings menu) how executions of a rote operation will be handled when no rote channels are available.

In one example, a user may be presented with an option to increase the maximum number of rote channels. For example, referring to FIG. 5, in one example, at $t_2$, a graphical user interface may be presented to a user that enables a user to associate channel 175 with a fifth rote channel. In one example, the graphical user interface may be overlaid on video that is currently being presented to a user. The graphical user interface may inform the user that there are no available rote channels in the rote stack and present the user with an option of adding a fifth rote channel to the rote stack. Further, in one example, a graphical user interface may be presented to a user that enables a user to choose which channel within the rote stack is replaced.

Figure 7:
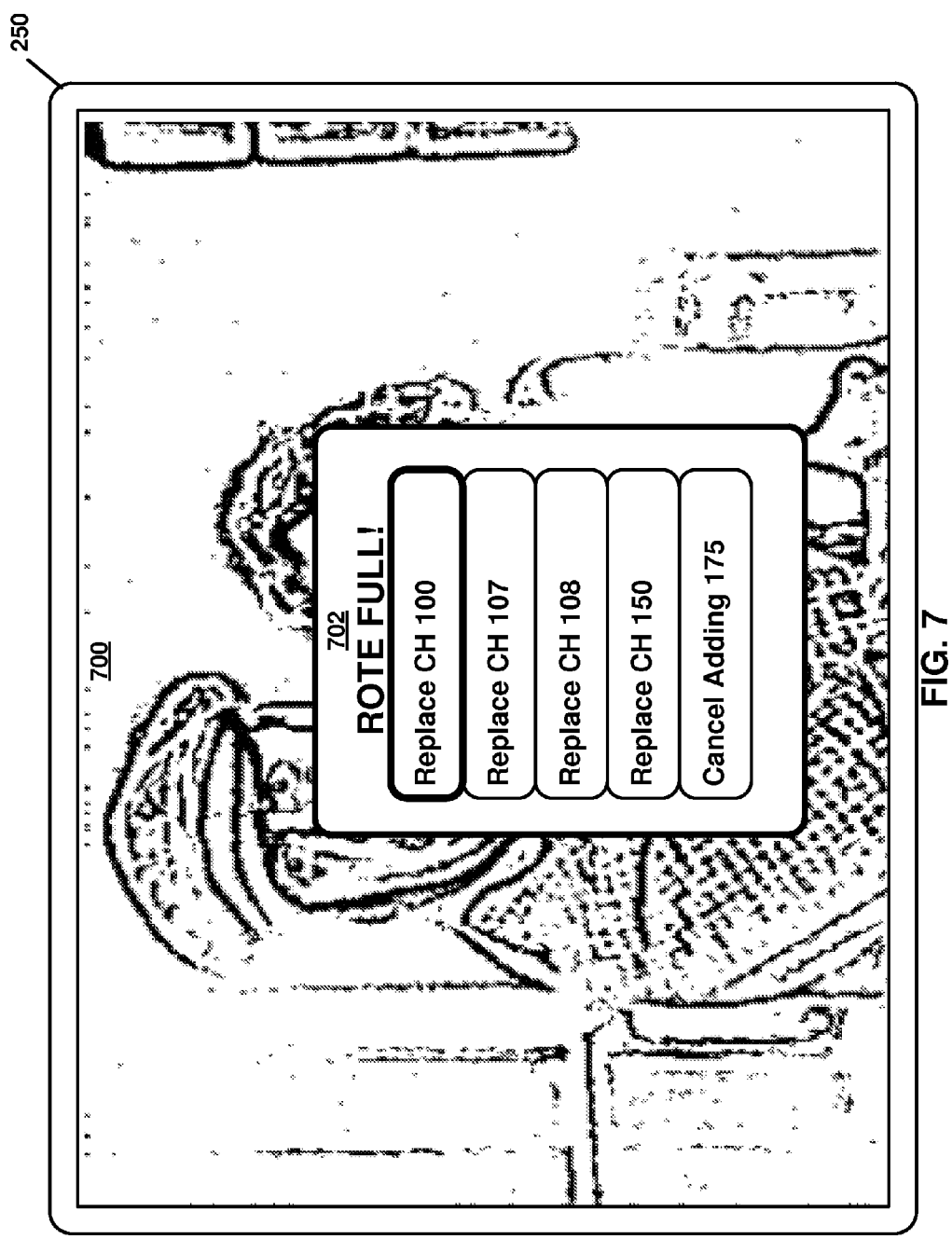
FIG. 7 is a conceptual diagram illustrating an example of a graphical user interface according to one or more techniques of this disclosure.

FIG. 7 is a conceptual diagram illustrating an example of a graphical user interface according to one or more techniques of this disclosure. Graphical user interface 700 illustrates an example of a graphical user interface that may be presented to a user when a user attempts to add a channel to a rote stack when the rote stack is full. For example, graphical user interface 700 may be presented to a user at $t_2$ in FIG. 5. As illustrated in FIG. 7, graphical user interface 700 includes window 702, where window 702 includes a plurality of icons, wherein each icon provides an option for resolving the case when a user attempts to add a channel to the rote stack when no rote channels are available. In the example illustrated in FIG. 7, a user may choose to replace any of the channels currently in the rote stack or cancel adding to the rote stack the channel that is currently being presented. It should be noted, that although not shown in FIG. 7, in one example window 702 may include text, images, and/or video indicative of programming that is currently being presented on each of the channels. Further, although not illustrated in FIG. 7, in one example, as described above, window 702 may include an option for a user to increase the number of channels in the rote stack. In this manner a computing device may be configured to replace a channel in the subset of channels with the currently presented channel based on received user input.

Figure 6:
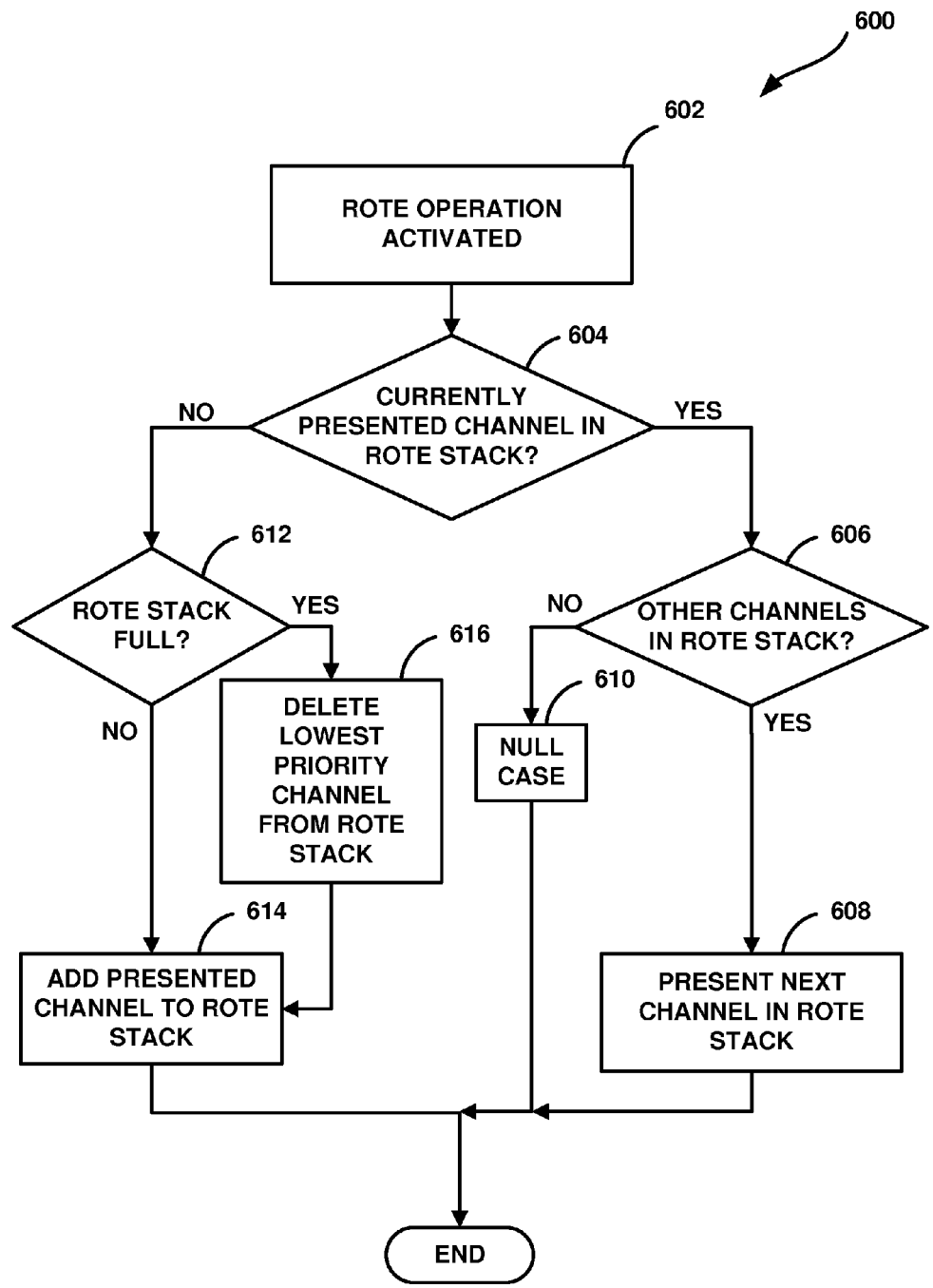
FIG. 6 is a flowchart illustrating an example of a channel recall function according to one or more techniques of this disclosure.

FIG. 6 is a flowchart illustrating an example of a channel recall function according to one or more techniques of this disclosure. FIG. 6 provides an example algorithm that may be executed by a computing device to execute an example rote function. An example use case of the example rote function illustrated in FIG. 6 are illustrated in FIGS. 4-5. As illustrated in FIG. 6, at 602 a rote operation is activated. In the example illustrated in FIG. 6, a rote operation may correspond to a dedicated rote operation. For example, a rote operation may correspond to activation of rote button 290 or a user providing a voice activated rote command (e.g., a user saying "Rotation"). Upon a rote operation being activated, a computing device determines whether a currently presented channel is in the rote stack (604). That is, as described above, with respect to FIG. 5, a determination is made whether the rote operation corresponds to a rote stack populating operation or a rote stack cycling operation. In one example, a currently presented channel may correspond to a channel that is currently being displayed in a full-screen presentation or a channel that is being presented in a main presentation window.

If it is determined that the currently presented channel is in the rote stack, a determination is made whether other channels are in the rote stack (606). If other channels are currently in the rote stack, the next channel in the rote stack is presented (608). An example of this is illustrated in FIG. 5, at $t_3$-$t_5$ and $t_8$-$t_{10}$. As described above, a computing device may be configured to display multiple videos simultaneously. In one example, cycling through a rote stack may cause videos to change positions on a display. For example, a video displayed in an ancillary presentation window (e.g., a Picture-in-Picture window) may be presented in the main presentation window and the video that was presented in the main presentation window may be presented in an ancillary presentation window. Thus, a rote function may enable a user to visually cycle channels in a rote stack (e.g., move and/or resize video presentations).

If other channels are not currently in the rote stack, a null condition occurs (610). That is, the current channel may remain the channel that is presented. Further, in one example, the computing device may provide the user with an indication that the null condition has occurred. For example, an audible indication (e.g., a tone) may occur or a visual indication may be presented to a user.

Referring again in FIG. 6, at 604 if it is determined that the currently presented channel is not in the rote stack, a determination is made whether the rote stack is full (612). If the rote stack is not full, the currently presented channel is added to the rote stack (614). An example of this is illustrated in FIG. 4, at $t_1$, $t_3$ and $t_7$. As described above, a situation may occur where there are no available channels in the rote stack. That is, it is determined that the rote stack is full. In this case, in one example, a channel may be deleted from the rote stack in order to add another channel to the rote stack. At 616, a channel is deleted from the rote stack. A channel may be deleted according to any of the techniques described above. For example, the oldest rote channel may be deleted or a graphical user interface that enables a user to select which channel to delete from the rote stack may be presented. After a channel has been deleted from the rote stack, at 614, assuming the user has not canceled adding the currently presented channel to the rote stack, the currently presented in channel is added to the rote stack. In this manner, a computing device configured to execute the algorithm illustrated in FIG. 6 represents an example of a computing device configured to determine whether a currently presented channel is included in a subset of channels, and based on whether the currently presented channel is included in the subset of channels, perform one of adding the currently presented channel to the subset of the channels or causing a channel included in the subset of channels to be presented.

As described above, a computing device may include recording functionality that may be configured to provide a review buffer, where a review buffer stores previously viewed portions of a currently tuned channel. A review buffer may enable a user to pause, rewind, and/or replay portions of a currently tuned television program. It should be noted that the number of available review buffers may be limited based on, for example, the hardware of a computing device. For example, a set-top box may only include three tuners and as such may only be able to implement a maximum of three review buffers. Further, the number of tuners available to be used as review buffers may be limited due to recordings that have been scheduled by a user. The techniques described herein may be used to manage how review buffers are associated with a channel that is currently being presented and channels in a rote stack.

Figure 8A:
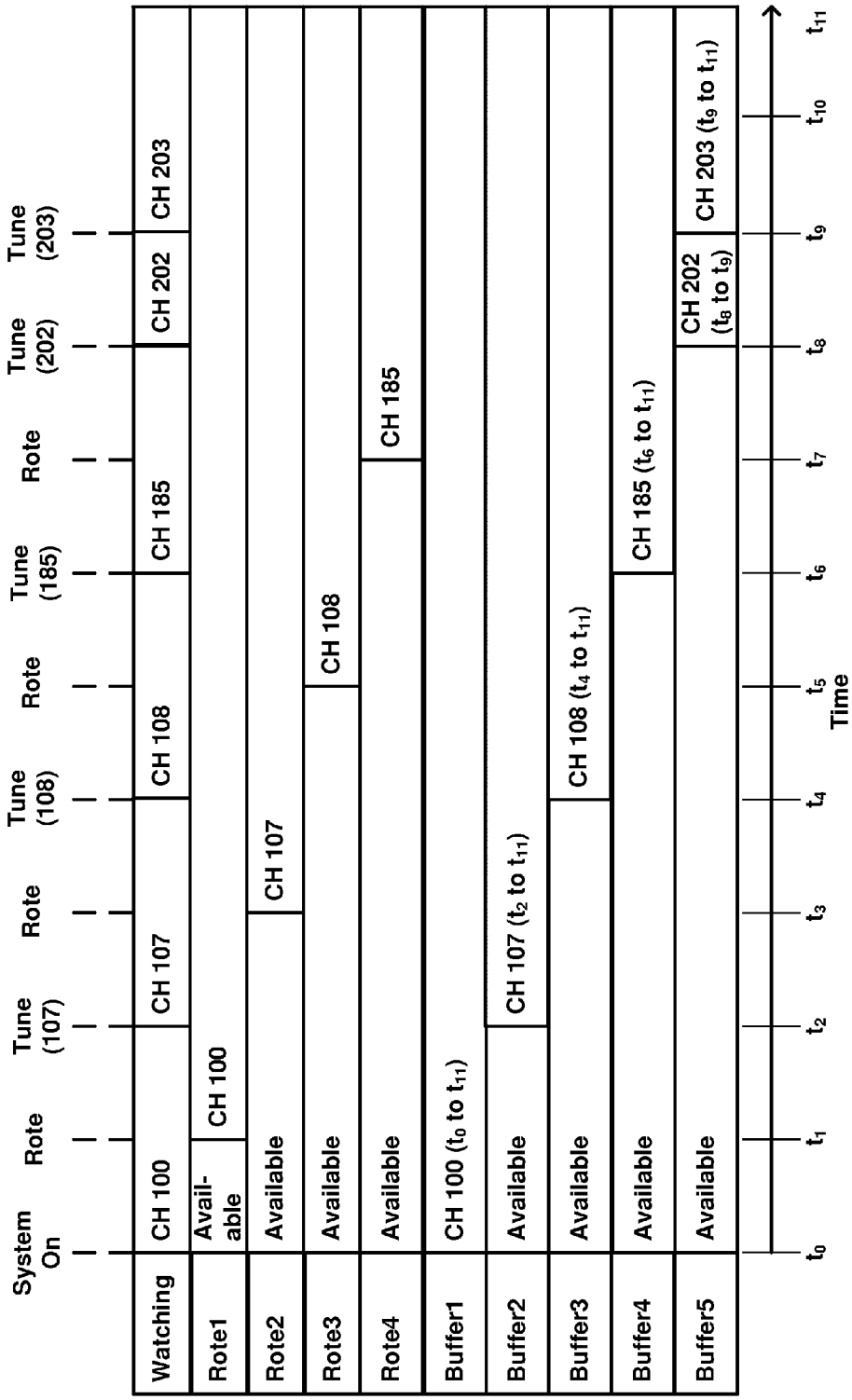
FIGS. 8A-8B are conceptual diagrams illustrating an example of a channel recall function according to one or more techniques of this disclosure.
Figure 8B:
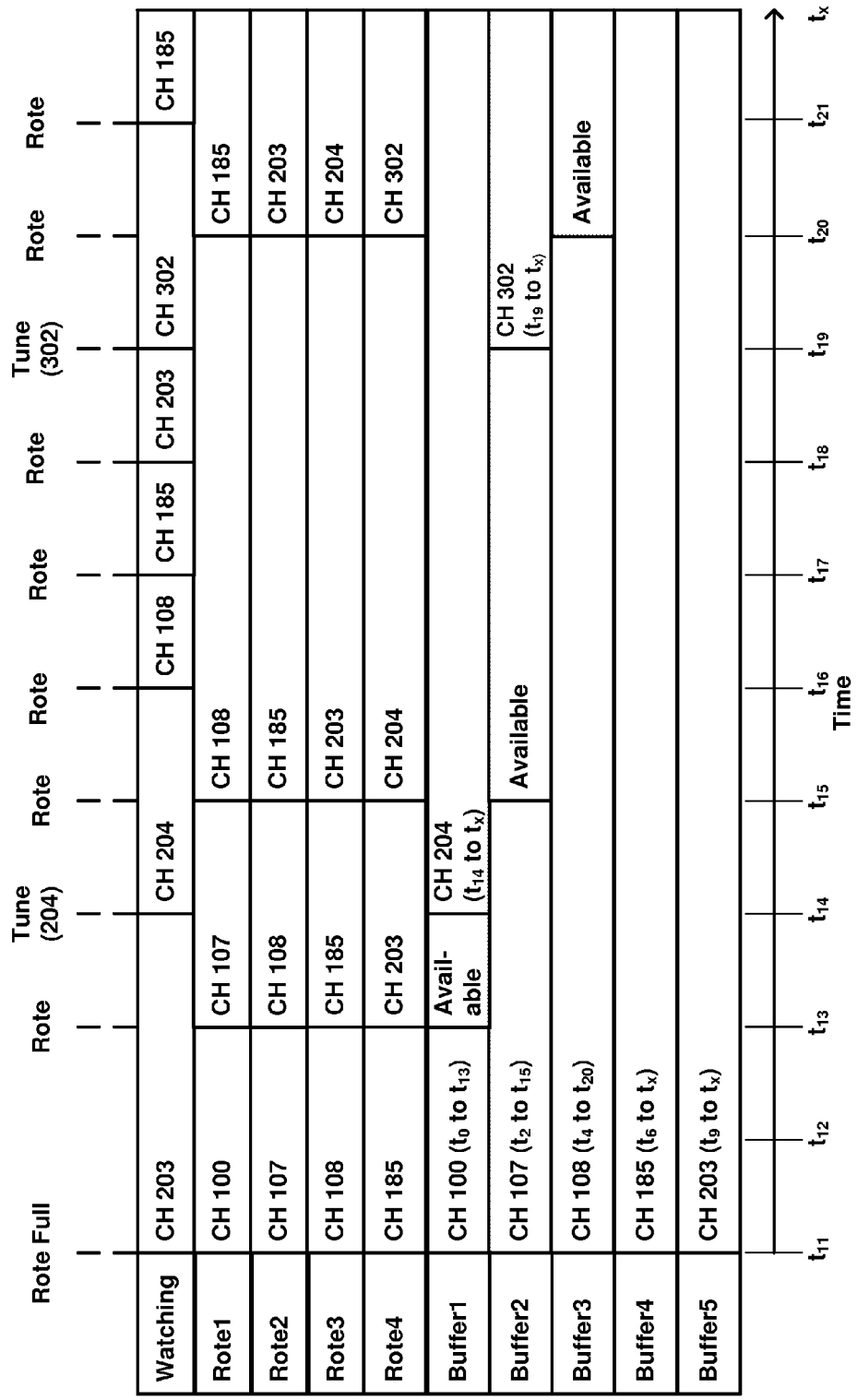

FIGS. 8A-8B are conceptual diagrams illustrating an example of a channel cycling function according to one or more techniques of this disclosure. In the example illustrated in FIGS. 8A-8B, there are N rote channels in the rote stack and N+1 review buffers. In the example illustrated in FIGS. 8A-8B from $t_0$ to $t_7$ a user populates a rote stack in a manner similar to that described above with respect to FIGS. 4-6. For the sake a brevity a description of populating a rote stack is not repeated. As further illustrated in FIGS. 8A-8B when a user tunes to a channel, a review buffer is assigned to the channel. For example, referring to FIG. 8A at t0 Buffer1 is assigned to channel 100, at $t_2$ Buffer2 is assigned to channel 107, at $t_4$ Buffer3 is assigned to channel 108, at $t_6$ Buffer4 is assigned to channel 185, and at $t_8$ Buffer5 is assigned to channel 202. Further, as illustrated in FIG. 8A at $t_9$ Buffer5 is reassigned from channel 202 to channel 203. That is, in this case a computing device may be configured such that because a user did not add channel 202 to the rote stack, a review buffer is not maintained for channel 202 upon a channel change. Further, a computing device may be configured such that when a user does add a channel to the rote stack, a review buffer is maintained for that channel 202 upon a channel change. An example of this is illustrated in FIG. 8B. As illustrated in FIG. 8B at $t_{13}$ a user adds channel 203 to the rote stack and Buffer5 is maintained channel 203 at $t_{14}$.

As further illustrated in FIG. 8B, at $t_{13}$, $t_{15}$, and $t_{20}$ when a user replaces a channel in the rote stack (e.g., replaces channel 100 with channel 203 at $t_{13}$, replaces channel 107 with channel 204 at $t_{15}$, and replaces channel 108 with channel 302 at $t_{20}$), a review buffer associated with a channel that is removed from the rote stack may become available and remain available until a user tunes to a channel not included in the rote stack. It should be noted that in other examples, a review buffer may continue to record programming with a channel that is removed from the rote stack until another review buffer is required. For example, in FIG. 8B, Buffer1 may remain assigned to channel 100 until $t_{14}$. Thus, in this example if a user inadvertently causes a channel to be removed from the rote stack, there is a possibility (e.g., if a user keys-in channel 100 at between $t_{13}$ and $t_{14}$) that a user may be able to recall programming associated with a channel that was removed from a rote stack.

Figure 9:
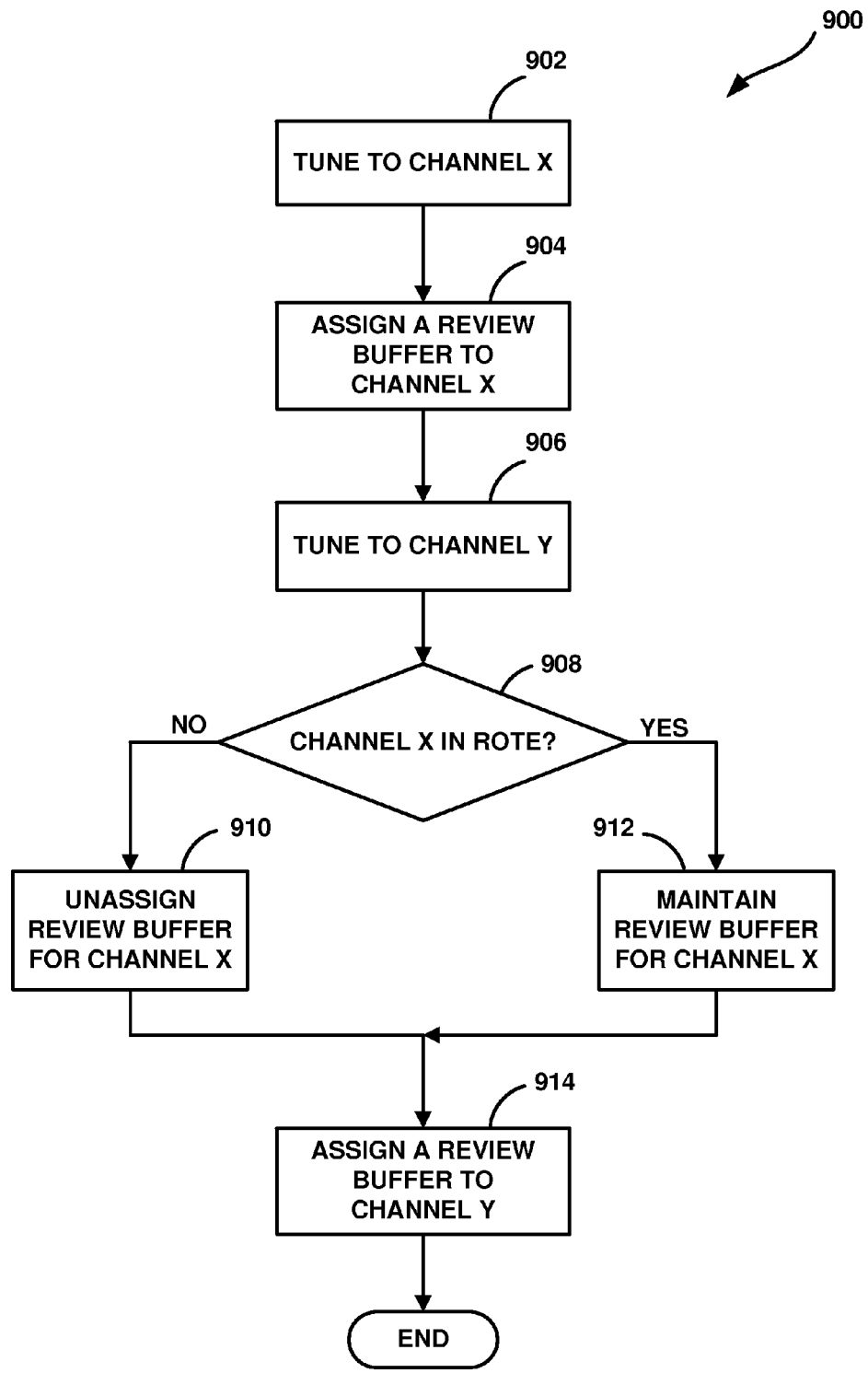
FIG. 9 is a flowchart illustrating an example of a channel recall function according to one or more techniques of this disclosure.

FIG. 9 is a flowchart illustrating an example of a channel cycling function according to one or more techniques of this disclosure. FIG. 9 provides an example algorithm that may be executed by a computing device to execute an example rote function with review buffer management. An example use case of the example rote function illustrated in FIG. 9 are illustrated in FIGS. 8A-8B. In the example illustrated in FIG. 9 it is assumed that there are N rote channels in a rote stack and N+1 available review buffers. As illustrated in FIG. 9, at 902 a computing device is tuned to channel X (e.g., using numeric keypad 261, channel up/down 264, or rote button 290), where channel X is an arbitrary channel, and a review buffer is assigned to channel X at 904. At 906 a computing device is tuned to channel Y. At 908 a determination is made whether channel X is a channel in the rote stack. If channel X is not in the rote stack, the review buffer associated with channel X may be unassigned (910). An example implementation of unassigning a review buffer is illustrated in FIGS. 8A-8B at $t_9$ where a review buffer is not maintained for channel 202. If channel X is in the rote stack, the review buffer associated with channel X may be maintained (912). An example implementation of maintaining a review buffer is illustrated in FIGS. 8A-8B at $t_4$ and $t_{14}$. At 914 a review buffer is assigned to channel Y. It should be noted that the review buffer that is assigned to channel Y may include review buffer that was unassigned at 910. An example implementation of unassigning a review buffer and subsequently assigning the review buffer is illustrated in FIG. 8A at $t_9$.

As described above, in some instances the number of available review buffers may be limited. For example, the number of available review buffers may be less than N+1, where N is the number of channels in a rote stack. When there are less than N+1 review buffers, review buffer conflicts may occur. That is, there are not enough review buffers to record each of the channels in a rote stack and a currently tuned channel. For example, a conflict may occur when all of the available review buffers are assigned to channels and a user tunes to a channel not included in the rote stack. A computing device may be configured to reassign review buffers based on one or more priority rules. For example, a computing device be configured to prioritize a currently presented channel. In this case, as described below in the examples illustrated in FIGS. 10A-12B, an assigned review buffer may be reassigned to a currently tuned channel. It should be noted that in other examples, channels in a rote stack may be prioritized over a currently presented channel. In one example, a computing device may be configured to enable a user to set review buffer priorities.

It should be noted that in the examples illustrated in FIGS. 10A-12B, the size of the rote stack is static (i.e., is four). In other examples, the size of the rote stack may be increased or decreased when a review buffer conflict occurs. For example, a computing device may be configured such that the maximum number of channels in a rote stack is based on the number of available review buffers. For example, N may be decreased to insure that there are N+1 review buffers. For example, the size of a rote stack may decrease from four to three if a review buffer becomes unavailable. For example, a scheduled recording may cause the number of review buffers to decreases from five to four. In some examples, a notification (e.g., a graphical user interface) may be presented to a user to indicate a change in the size of a rote stack. In one example, a user may be able to set how review buffer conflicts are handled.

Figure 10B:
Figure 11A:
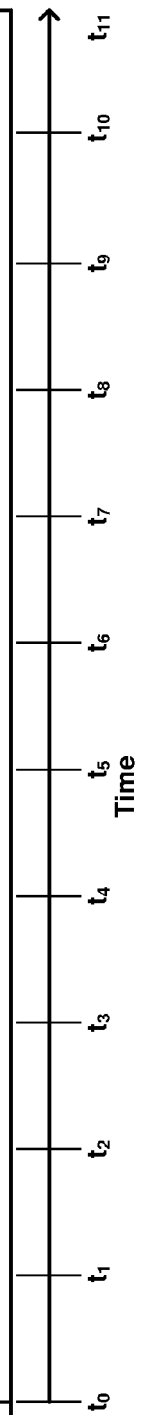
Figure 11B:
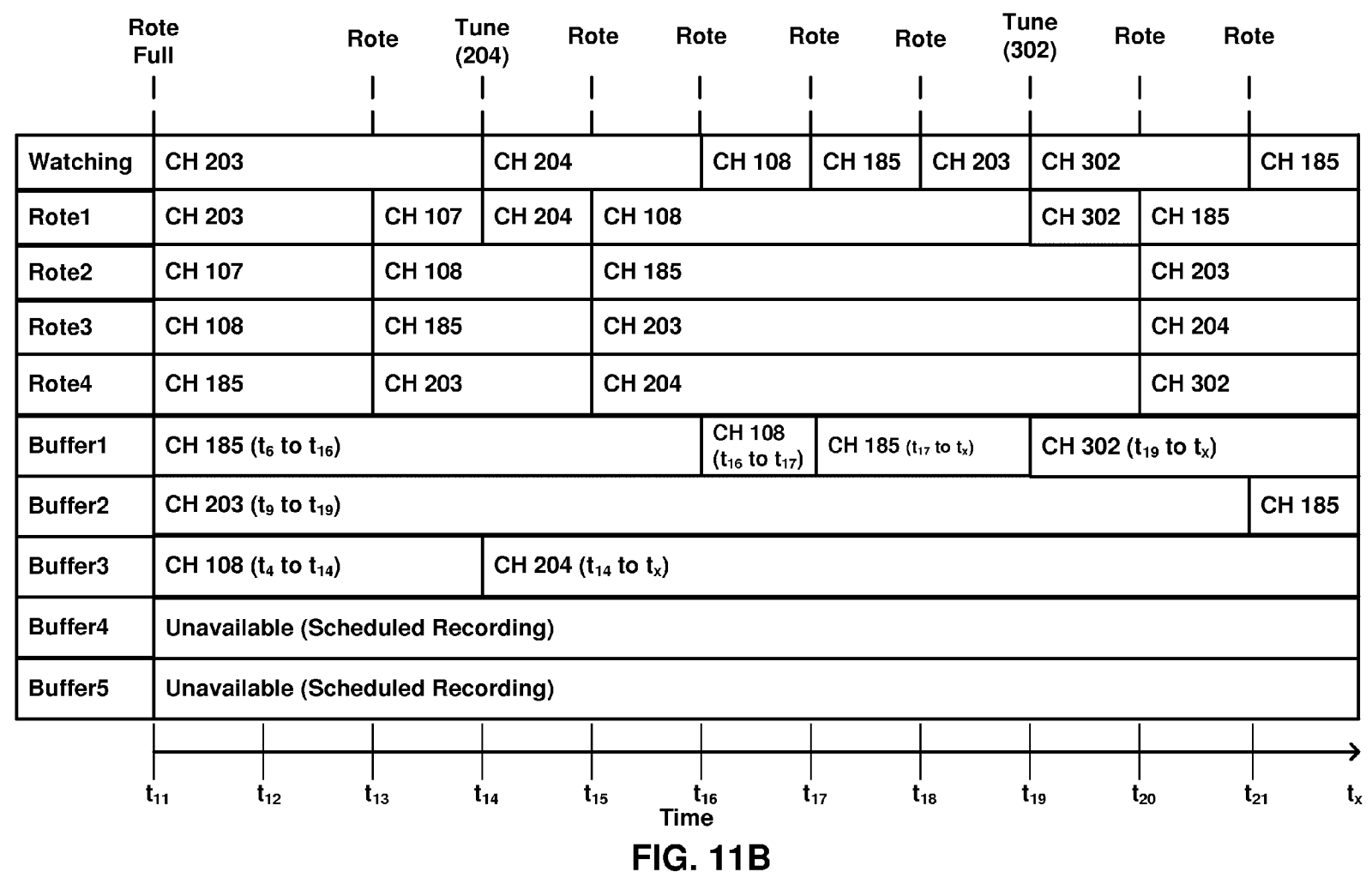
Figure 12A:
FIGS. 12A-12B are conceptual diagrams illustrating an example of a channel cycling function according to one or more techniques of this disclosure.
Figure 12B:
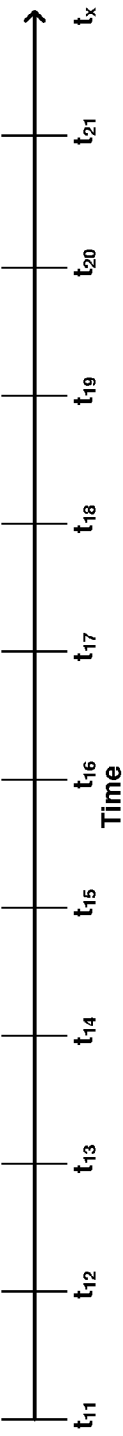

FIGS. 10A-12B are conceptual diagrams illustrating examples of a channel cycling function according to one or more techniques of this disclosure. In the example illustrated in FIGS. 10A-10B, there are N available rote channels and N review buffers. In the example illustrated in FIGS. 11A-11B, there are N available rote channels and N−1 review buffers. FIGS. 12A-12B are conceptual diagrams illustrating an example of a channel cycling function according to one or more techniques of this disclosure. In the example illustrated in FIGS. 12A-12B, there are N available rote channels and N−2 review buffers. In each of the examples illustrated in FIGS. 10A-12B a computing device is configured such that a review buffer is assigned to a currently tuned channel. As described above, in other examples, a computing device may be configured to assign review buffers in another manner. It should be noted that when N equals four, as in the examples illustrated in FIGS. 10A-12B, N−3 equals one. In the case where there is only one available review buffer, the review buffer may be assigned to the currently tuned channel.

In each of the examples illustrated in FIGS. 10A-12B a user performs the same operations as illustrated in FIGS. 8A-8B. However, unlike the example illustrated in FIGS. 8A-8B, review buffer conflicts occur. Referring to FIGS. 10A-10B at $t_5$, $t_9$, $t_{14}$ and $t_{19}$ review buffer conflicts occur. Referring to FIGS. 11A-11B at $t_6$, $t_8$, $t_9$, $t_{14}$, $t_{16}$, $t_{17}$, $t_{19}$, and $t_{21}$ review buffer conflicts occur. Referring to FIGS. 12A-12B at $t_4$, $t_6$, $t_8$, $t_9$, $t_{14}$, $t_{16}$, $t_{17}$, $t_{18}$, $t_{19}$, and $t_{21}$ review buffer conflicts occur. That is, at each of these times, a user tunes to a channel (either a channel included in the rote stack or a channel not included in the rote stack) that is not assigned a review buffer and all available review buffers are assigned to other channels. Thus, in the examples illustrated in FIGS. 10A-12B in order for a review buffer to be assigned to a currently tuned channel, as is the first priority in these examples, a review buffer must be reassigned. In addition, as described in greater detail below, when a review buffer is reassigned, it may be desirable to add and/or remove a channel from a rote stack.

Figure 13:
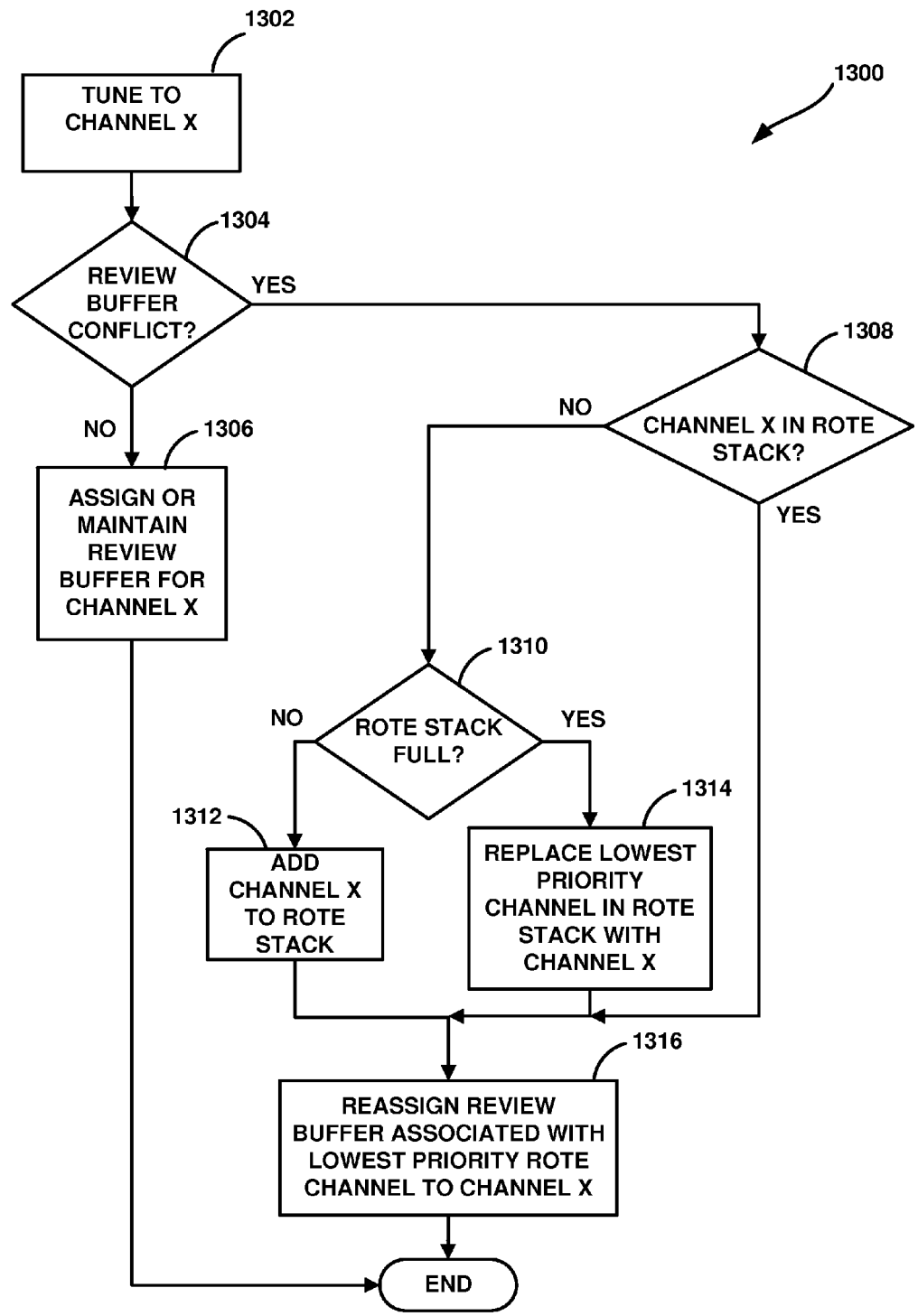
FIG. 13 is a flowchart illustrating an example of a channel recall function according to one or more techniques of this disclosure.

FIG. 13 is a flowchart illustrating an example of a channel cycling function according to one or more techniques of this disclosure. FIG. 13 provides an example algorithm that may be executed by a computing device to resolve review buffer conflicts. An example use case of the example rote function illustrated in FIG. 13 are illustrated in FIGS. 10A-12B. In the example illustrated in FIG. 13, review buffers may be reassigned and channels may be removed from the rote stack. At 1302 a computing device is tuned to channel X (e.g., using numeric keypad 261, channel up/down 264, or rote button 290. At 1304 a computing device determines whether a review buffer conflict occurs. If no review buffer conflict occurs (e.g., a review buffer is available or a review buffer is already assigned to channel X), computing assigns or maintains a review buffer for channel X (1306). Examples of assigning or maintaining a review buffer when no conflict occurs are illustrated in FIG. 10A at $t_6$ and FIG. 10B at $t_{17}$.

If there is a review buffer conflict, a review buffer associated with the lowest priority channel in the rote stack is reassigned to channel X (1308). In this manner, a currently presented channel is assigned a review buffer. In the examples illustrated in FIGS. 10A-12B, a lowest priority channel may include the latest channel added to the rote stack or the oldest channel added to the rote stack by a user. Examples of reassigning the review buffer associated with the latest channel added to the rote stack is illustrated in FIGS. 10A, 11A, and 12A at $t_9$. In each of these examples, channel 202 was added to the rote stack at $t_8$ upon a user tuning to channel 202 and not by a user activating of a rote function. As such, channel 202 may be considered to have a lower priority than any channel that was explicitly added to the rote stack by a user.

As described in detail below, with respect to 1316, in the examples illustrated in FIGS. 10A-10B, a computing device may be configured to add a channel to the rote stack upon reassigning a review buffer. In some cases, adding a channel to the rote stack upon reassigning a review buffer may be more desirable to a user than an alternative approach of keeping the channel without an assigned review buffer in the rote stack. For example, as illustrated in FIG. 10A-10B at $t_9$ through $t_{13}$, if a user is tuning to channels not included in the rote stack, there is a likelihood that a user is searching for programming on a channel not currently in the rote stack. In this manner, there is a likelihood that a user will add a new channel to the rote stack and wish to explicitly replace a channel currently in the rote stack.

Examples of reassigning the review buffer associated with the oldest channel added to the rote stack by a user are illustrated in FIGS. 10A, 11A, and 12A at $t_5$. As illustrated in FIG. 13, after a review buffer is reassigned, a determination is made whether channel X is in the rote stack (1310). If channel X is already in the rote stack, the process ends. An example of this case is illustrated in FIG. 11B at $t_{17}$. In this example, a review buffer is reassigned from channel 108 to channel 185. Other examples of a review buffer conflicts caused by rote stack cycling are illustrated in FIG. 11B at $t_{16}$, and $t_{21}$, and in FIG. 12B at $t_{16}$, $t_{17}$, $t_{18}$, and $t_{21}$.

As described above, it may be desirable to add a channel to the rote stack upon reassigning a review buffer to a channel. Thus, if channel X is not already in the rote stack, channel X may be added to the rote stack. In the case where the rote stack includes an available rote channel, channel X may be added to the rote stack (1314). An example where channel X is added to the rote stack when the rote stack is not full is illustrated FIG. 11A at $t_6$ and FIG. 12A at $t_4$ and $t_6$. However, if a rote stack is full, a lowest priority channel in the rote stack may be replaced so that channel X may be added to the rote stack (1316). It should be noted that priorities may differ for purposes of review buffer reassignment and rote stack replacement. An example of this is illustrated in FIG. 12B at $t_5$. In this instance, a review buffer associated with channel 107 is reassigned to channel 202 and channel 100 is replaced in the rote stack with channel 202. Further it should be noted, as illustrated in FIGS. 10B, 11B, and 12B at $t_{13}$ activation of a rote operation may cause the priority of channels within a rote stack to change. In this manner, a computing device configured to execute the algorithm illustrated in FIG. 13 represents an example of a computing device configured to determine whether a review buffer conflict occurs and upon determine that a review buffer conflict does occurs, reassigning a review buffer associated with a lowest priority channel.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of enabling a user to cause programming associated with a channel to be presented, the method comprising:
   receiving, by a computing device, from a mobile device, a command to initiate a function to cycle through a subset of channels accessible at a media device;
   in response to receiving the command, determining, by the computing device, whether a currently presented channel that is accessed at the media device is included in the subset of channels;
   based on determining that the currently presented channel is not included in the subset of channels, in response to receiving the command, updating, by the computing device, the subset of channels to add the currently presented channel that is accessed at the media device, the adding of the currently presented channel to the subset of channels including replacing a channel included in a rotation stack with the currently presented channel in response to determining the rotation stack is full, wherein the rotation stack corresponds to the subset of channels, wherein determining that the rotation stack is full includes determining that a maximum number of channels have been added to the rotation stack, and
   based on determining that the currently presented channel is included in the subset of channels, in response to receiving the command, causing, by the computing device, a further channel included in the subset of channels to be presented at the media device.

2. The method of claim 1, wherein the command includes activation of a button or a vocal command.

3. The method of claim 1, further comprising enabling a user to set the maximum number of channels that may be included in the subset of channels.

4. The method of claim 1, wherein replacing the channel in the rotation stack with the currently presented channel includes replacing the channel based on a priority rule.

5. The method of claim 1, wherein replacing the channel in the rotation stack with the currently presented channel includes replacing the channel based on received input.

6. The method of claim 1, wherein the media device includes the computing device.

7. The method of claim 1, wherein causing the further channel included in the subset of channels to be presented includes causing the further channel to be presented in a full screen presentation or a main presentation window.

8. The method of claim 1, wherein the currently presented channel and each of the channels included in the subset of channels are assigned a respective review buffer.

9. The method of claim 8, further comprising:
   receiving a command to tune to a second channel other than the currently presented channel;
   determining whether a review buffer conflict occurs; and
   upon determining that a review buffer conflict occurs, reassigning a review buffer associated with a lowest priority channel in the subset of channels to the second channel.

10. A device for enabling a user to cause programming associated with a channel to be presented, the device comprising one or more processors configured to perform operations comprising:
    receiving, at the device, from a mobile device, a command to initiate a function to cycle through a subset of channels accessible at a media device;
    in response to receiving the command, determining, by the device, whether a currently presented channel that is accessed at the media device is included in the subset of channels;
    based on determining that the currently presented channel is not included in the subset of channels, in response to receiving the command, updating, by the device, the subset of channels to add the currently presented channel that is accessed at the media device, the adding of the currently presented channel to the subset of channels including replacing a channel included in a rotation stack with the currently presented channel in response to determining the rotation stack is full, wherein the rotation stack corresponds to the subset of channels, wherein determining that the rotation stack is full includes determining a maximum number of channels have been added to the rotation stack;
    based on determining that the currently presented channel is included in the subset of channels, in response to receiving the command, causing, by the device, a further channel included in the subset of channels to be presented at the media device.

11. The device of claim 10, wherein the command includes activation of a button or a vocal command.

12. The device of claim 10, wherein the one or more processors are further configured to enable a user to set the maximum number of channels that may be included in the subset of channels.

13. The device of claim 10, wherein replacing the channel in the rotation stack with the currently presented channel includes replacing the channel based on a priority rule.

14. The device of claim 10, wherein replacing the channel in the rotation stack with the currently presented channel includes replacing the channel based on received input.

15. The device of claim 14, wherein the received input includes input received through activation of icons included in a graphical user interface.

16. The device of claim 10, wherein causing the further channel included in the subset of channels to be presented includes causing the further channel to be presented in a full screen presentation or a main presentation window.

17. The device of claim 10, wherein the currently presented channel and each of the channels included in the subset of channels are assigned a respective review buffer.

18. The device of claim 14, wherein the one or more processors are further configured to:
  receive a command to tune a second channel other than the currently presented channel;
  determine whether a review buffer conflict occurs; and
  upon determining that a review buffer conflict occurs, reassign a review buffer associated with a lowest priority channel in the subset of channels to the second channel.

19. A non-transitory computer-readable storage medium comprising instructions stored thereon that upon execution cause one or more processors of a device to perform operations comprising:
  receiving, by the device, from a mobile device, a command to initiate a function to cycle through a subset of channels accessible at a media device;
  in response to receiving the command, determining, by the computer device, whether a currently presented channel is included in a subset of channels;
  based on determining that the currently presented channel is not included in the subset of channels in response to receiving the command, updating, by the device, the subset of channels to add the currently presented channel that is accessed at the media device, the adding of the currently presented channel to the subset of channels including replacing a channel included in a rotation stack with the currently presented channel in response to determining rotation stack is full, wherein the rotation stack corresponds to the subset of channels, wherein determining that the rotation stack is full includes determining a maximum number of channels have been added to the rotation stack and
  based on determining that the currently presented channel is included in the subset of channels, in response to receiving the command, causing, by the device, a further channel included in the subset of channels to be presented at the media device.

20. The non-transitory computer readable medium of claim 19, further comprising instructions stored thereon that upon execution cause one or more processors of a device to
  receive a command to tune a second channel other than the currently presented channel;
  determine whether a review buffer conflict occurs; and
  upon determining that a review buffer conflict occurs, reassign a review buffer associated with a lowest priority channel in the subset of channels to the second channel.

21. A method of causing programming associated with a channel to be presented, the method comprising:
  receiving, by a computer device, from a mobile device, a command to initiate a function to cycle through a subset of channels accessible at a media device;
  in response to receiving the command, determining, by the computer device, whether a currently presented channel that is accessed at the media device, is included in the subset of channels;
  based on determining that the currently presented channel is not included in the subset of channels, in response to receiving the command, updating, by the computing device, the subset of channels to add the currently presented channel that is accessed at the media device, the adding of the currently presented channel to the subset of channels including replacing a channel in the subset of channels with the currently presented channel in response to determining the subset of channels includes a maximum number of channels, and
  based on determining that the currently presented channel is included in the subset of channels, in response to receiving the command, causing, by the computing device, a further channel included in the subset of channels to be presented at the media device.

22. The method of claim 21, further comprising enabling a user to set the maximum number of channels that may be included in the subset of channels.

23. The method of claim 21, wherein the maximum number of channels that may be included in the subset of channels is based on a number of available review buffers.

24. The method of claim 23, wherein the maximum number of channels that may be included in the subset of channels is decreased in response to a scheduled recording causing a number of available review buffers to be decreased.

* * * * *